Figure 1:
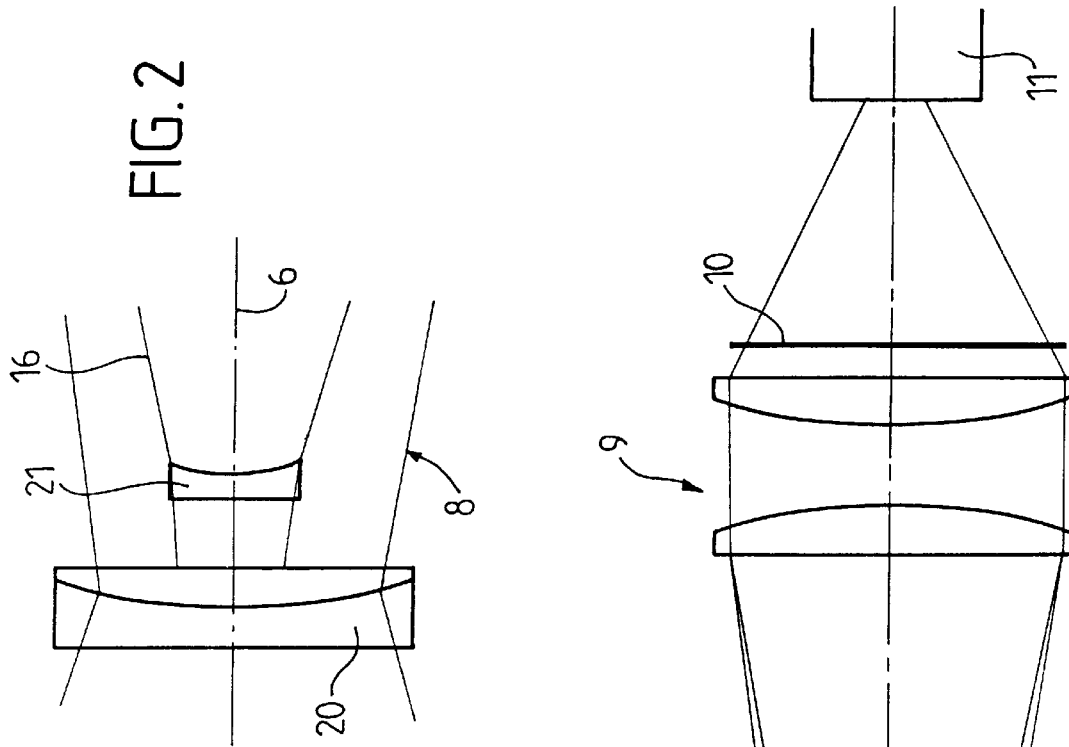

United States Patent
Ruellan

Patent Number: 6,034,822
Date of Patent: Mar. 7, 2000

[54] DEVICE FOR DISTRIBUTING LIGHT ON AN IMAGE FRAME

[75] Inventor: Yves Ruellan, Neuilly sur Seine, France

[73] Assignee: Hardware, Nanterre, France

[21] Appl. No.: 09/171,102

[22] PCT Filed: Apr. 1, 1997

[86] PCT No.: PCT/FR97/00577

§ 371 Date: Oct. 13, 1998

§ 102(e) Date: Oct. 13, 1998

[87] PCT Pub. No.: WO97/38352

PCT Pub. Date: Oct. 16, 1997

[30] Foreign Application Priority Data

Apr. 10, 1996 [FR] France ................................. 96 04469

[51] Int. Cl.[7] ................................................. G02B 27/10
[52] U.S. Cl. .................... 359/626; 359/668; 359/711; 359/799; 359/800; 359/868; 359/619
[58] Field of Search .................... 359/626, 618, 359/668, 710, 711, 798, 799, 800, 868, 869, 588, 619

[56] References Cited

U.S. PATENT DOCUMENTS

| 3,615,161 | 10/1971 | Bragg ........................ 359/588 |
| 3,930,713 | 1/1976 | Stankewitz et al. ............. 359/800 |
| 4,273,443 | 6/1981 | Hogg ........................ 359/626 |
| 5,142,416 | 8/1992 | Nakamura et al. ............. 359/711 |
| 5,191,474 | 3/1993 | Suzuki et al. ................. 359/668 |
| 5,442,252 | 8/1995 | Golz ........................ 359/626 |
| 5,745,294 | 4/1998 | Kudo ........................ 359/618 |
| 5,757,557 | 5/1998 | Medvedev et al. ............. 359/711 |
| 5,786,939 | 7/1998 | Watanabe .................... 359/626 |
| 5,909,316 | 6/1999 | Watanabe .................... 359/619 |

Primary Examiner—Loha Ben
Attorney, Agent, or Firm—Venable; George H. Spencer

[57] ABSTRACT

A device uses a divergent lens (7) having a concave surface with a central region (12) and a peripheral region (13) of lower curvature than the central region. The light beam (16) crossing the central region is spread over the entire surface of the image frame (10), thereby avoiding a concentration of light in the central portion thereof, and ensuring a more uniform illumination. The device is useful for large size slide projectors using a xenon arc lamp.

9 Claims, 3 Drawing Sheets

DEVICE FOR DISTRIBUTING LIGHT ON AN IMAGE FRAME

The invention concerns a device for distributing light emitted by a virtual point source on the surface of an image frame, comprising focussing means for projecting said light towards an image point of the source, a divergent optical element suitable for transforming the convergent beam emanating from the focussing means into a divergent beam, and a condenser lens collecting said divergent beam to concentrate it towards the image frame. The invention applies more particularly to the case where the image frame has a dimension exceeding 8 cm.

Xenon arc lamps with a power of at least 1600 W are used in large-format slide projectors. In these projectors the xenon arc lamp is used as a virtual point light source, that is to say the light emitted by a reduced volume, whose dimensions are only a few millimeters, is collected and transmitted by various optical elements. In the interior of this small volume there is a large luminance gradient between the anode and the cathode. The very high luminance (hot point) close to the cathode is translated into a hot point at the centre of the slide. To avoid burning the latter, a known solution consists in spreading the beam, which results in the loss of a large part of the light. Furthermore, the illumination of the surface of the slide remain very heterogenous, the illumination being nearly twice as weak at the edges than at the centre.

The object of the invention is to remedy the stated drawbacks and at the same time improve the efficiency of light collection on the slide, or any other image frame, and the uniformity of its distribution on the latter.

This problem arises more particularly in the case of a stationary frame, that is to say one which remains immobile for a prolonged period, or is moved at slow speed, as opposed to a cinematographic film which runs continuously and rapidly.

The invention concerns in particular a device of the type defined in the introduction, and makes provision for the divergent optical element to comprise a central part traversed by the axis of the beam and an annular peripheral part surrounding the central part, the latter having a higher optical power than that of the peripheral part, so that the light rays which pass through it are more or less distributed over the same area of the image frame as the totality of rays passing through the divergent optical element.

Optional features of the device according to the invention, supplementary or alternative, are stated below:

the divergent optical element comprises at least one lens whose one face is concave and has a radius of curvature which is smaller in a central region than in the peripheral region surrounding the central region, said central region and said peripheral region defining the central and peripheral parts of the divergent element;

the divergent optical element comprises at least two divergent lenses arranged in succession along the axis of the beam and extending radially over different distances from said axis, the lens with the smaller radial extension defining the central part of the divergent optical element;

the one lens or each lens of the divergent element has a plane face and a concave face;

said plane face is the entry face;

the source is a xenon arc lamp;

said lamp has a power that is more than or equal to 1600 W;

the focussing means comprise an ellipsoidal concave mirror;

it comprises an objective lens arranged after the image frame, suitable for projecting on a screen having sides of several metres an image formed on said image frame.

Figure 2:
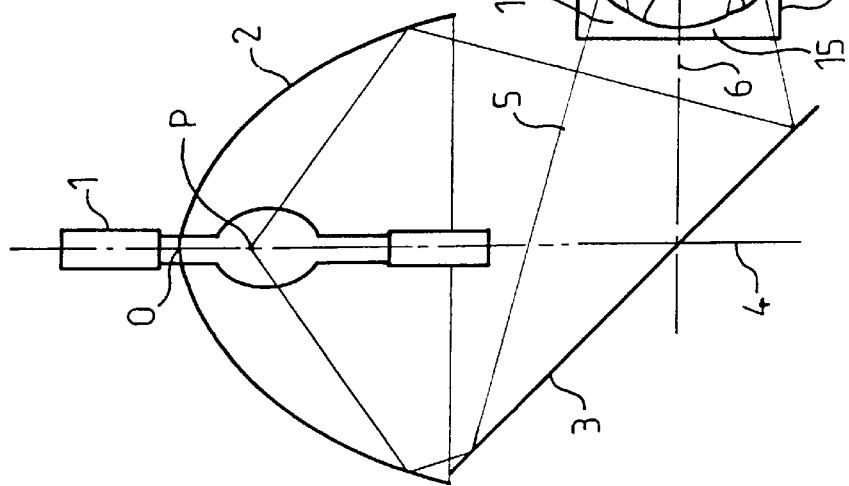
Figure 3:
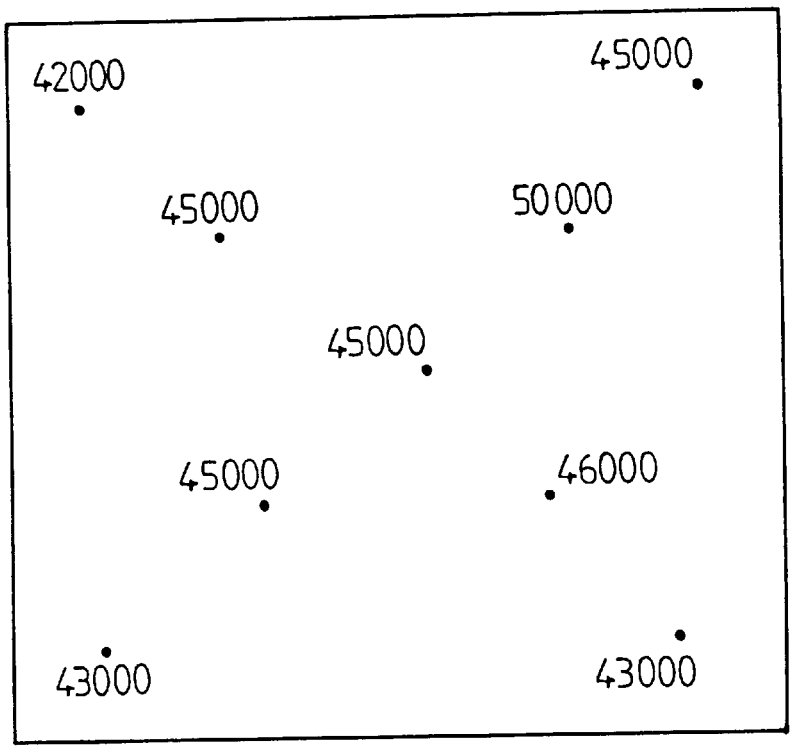
Figure 5:
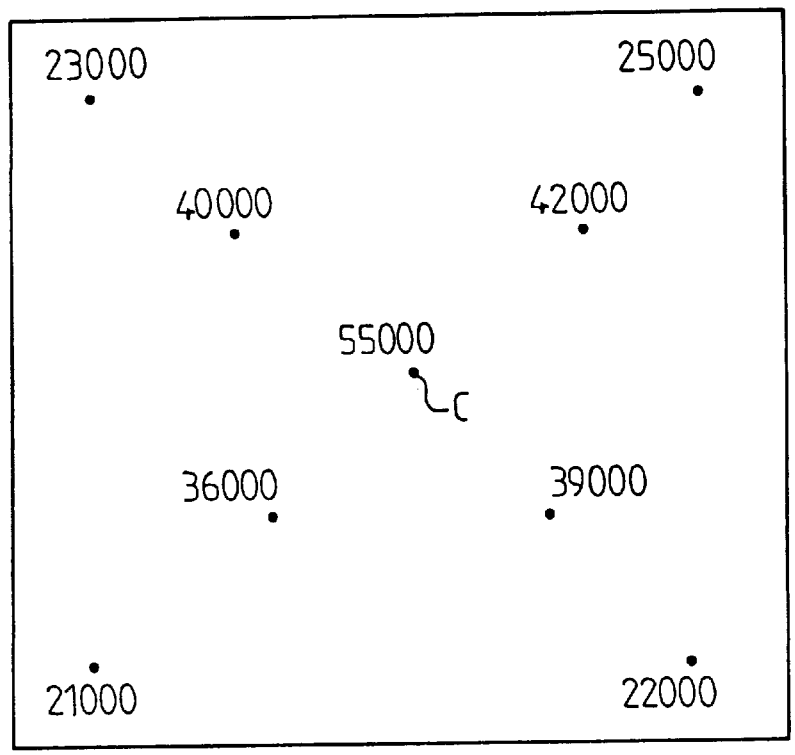
Figure 4:
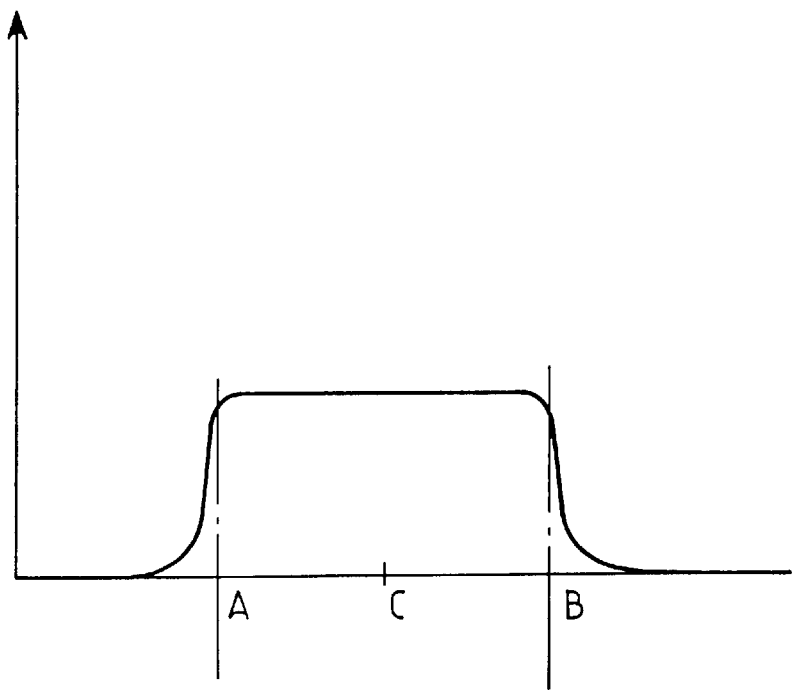
Figure 6:
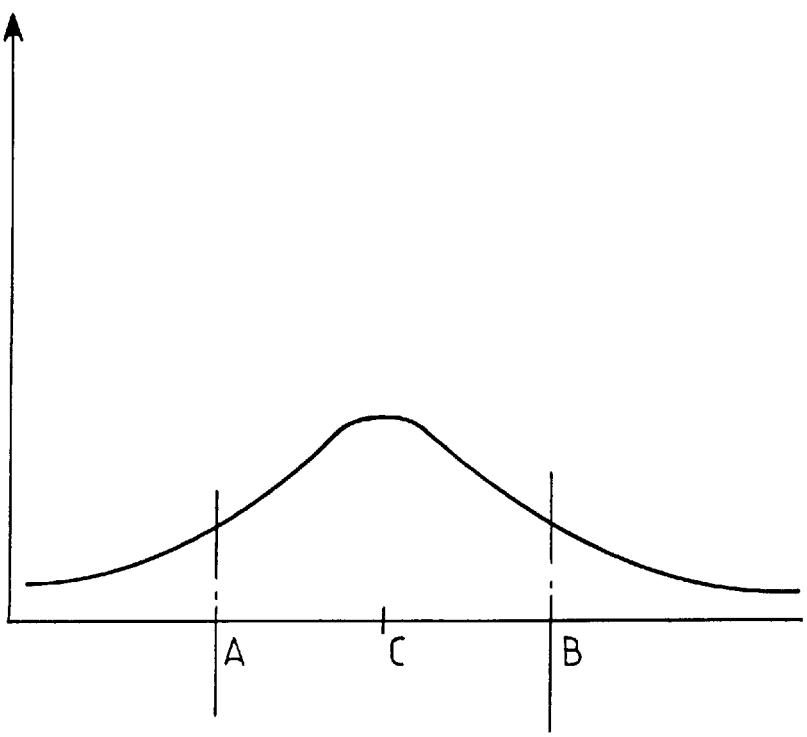

The features and advantages of the invention will be explained in more detail in the description below with reference to the attached drawings, of which:

FIG. 1 is a partial schematic representation of a slide projector according to the invention;

FIG. 2 corresponds to an enlarged part of FIG. 1, for a variant of the device;

FIGS. 3 and 4 are diagrams illustrating the distribution of light on a screen, obtained by means of a projector according to the invention; and FIGS. 5 and 6 are diagrams similar to those in FIGS. 3 and 4, relating to a known projector.

The projector illustrated in FIG. 1 uses a xenon arc lamp 1 as a light source. Such a lamp emits virtually white light from a very reduced volume comparable to a point P. However, the luminance varies widely in the interior of this small volume. For example, in the case of a lamp sold by the OSRAM company under the designation XBO, with a power of 2500 W, the luminance varies from a maximum value of 360000 cd/cm$^2$ in the immediate vicinity of the centre of the cathode to 10000 cd/cm$^2$ at the centre of the anode.

The point P is located at the primary focus of an ellipsoidal concave mirror 2 having a vertical axis, the concavity of which is directed downwards. A cold mirror reflector 3, orientated at 45° with respect to the axis 4 of the concave mirror 2, is traversed by the infrared rays reflected by said concave mirror and reflects the visible rays into a convergent beam 5 having a horizontal axis 6. The beam 5 passes through a divergent lens 7, which transforms it into a divergent beam 8, which arrives at a condenser lens 9, represented here in the form of two convergent lenses. The condenser lens 9 is immediately followed along the axis 6 by a slide 10, on the surface of which is distributed the light emitted by the lamp 1 and processed by the mirrors 2 and 3, the lens 7 and the condenser lens 9. An objective lens 11, also centred on the axis 6, enables the contents of the slide to be projected onto a vertical screen, not shown, placed at a distance from the projector.

The general construction of the projector just described is known, and FIGS. 5 and 6 show the distribution of light obtained during the projection of a square slide having sides of 155 mm, uniformly white, on a screen having sides of 1 meter, using a single divergent lens as the lens 7. In FIG. 5, the numbers shown alongside the points represent the illumination in lux at the points under consideration. The curve in FIG. 6 represents the variations in the illumination along a straight line passing through the centre C of the screen and through the positions A and B on opposite sides of said centre. It can be seen that the illumination varies more or less in a ratio of two to one between point C and each of points A and B. The ratio is even greater (FIG. 5) between the centre C and the angular zones of the screen. Furthermore, FIG. 6 shows that an appreciable amount of light is projected beyond points A and B, that is to say, to the exterior of the square screen, and lost as a result.

According to the invention, the concave exit face of the lens 7 has a central region 12 in the form of a spherical cup which is joined to a peripheral region 13 in the form of a spherical ring. Both the regions 12 and 13 revolve about the axis 6. Region 13 has a radius of curvature that is greater than that of region 12, so as to define an annular part 14 of the lens with a lower optical power than that of the central part 15 defined by region 12. The radii of curvature of regions 12 and 13 are chosen so that the part 16 of the beam 8 traversing the central part 15 of the lens is distributed more or less over all of the useful surface of the condenser lens 9, as is the whole of the beam 8. This results in a wider distribution of the light emanating from the hottest region of the lamp 1, the light coming from the source no longer being spread in its entirety and thus finally being projected at the interior of the screen.

FIGS. 3 and 4, obtained in the same way as FIGS. 5 and 6, from a projection produced by using the lens 7 already described, show that the light is in fact collected almost entirely at the screen and distributed more or less uniformly on the surface of said screen.

An exemplary embodiment of the invention is described in detail below. An OSRAM XBO lamp, with a power of 2000 W, is used. This lamp passes through a central opening with a diameter of 55 mm made in the base of the ellipsoidal mirror 2, which has an opening diameter of 203 mm, the two foci being at 30 mm and 420 mm from the apex O of the mirror, respectively. The reflection coefficient of the mirror 2 is 0.80. The entry face of the lens 7 is located at 320 mm from the point O, taking into account the reflection of the mirror 3. The radii of curvature of regions 12 and 13 of the exit face are 32 and 43 mm respectively, the external diameters of these regions being 36 and 72 mm, respectively. The slide 10 is a square with sides of 155 mm, placed at a distance of 887 mm from the point O. The two lenses of the condenser lens 9 have a diameter of 230 mm. The plane entry face of the first lens is 769 mm from the point O, and its exit face has the form of a convex spherical cup with a radius of 233 mm. The entry face of the second lens, placed at 829 mm from the point O, has a convex radius of curvature of 175 mm, and its exit face is plane. The refractive index of the lens 7 is 1.48 and that of the lenses 9 is 1.52. Taking into account all the above numerical values, the light directed to the slide emanates from a region of the lamp in the form of a cylinder having a diameter of 1.3 mm and a length of 3 mm, one of whose bases has the centre of the cathode as its centre. The luminous flux received by the slide represents approximately 43% of the total radiated flux, and the ratio between the minimum illumination and the maximum illumination is approximately 70%.

As shown in FIG. 2, the lens 7 can be replaced by two divergent lenses of different diameters, arranged one after the other in the light path. In the example shown, each of these two lenses has a plane entry face and an exit face in the form of a concave spherical cup, the second lens 21 being smaller than the first lens 20. The latter is therefore traversed by the totality of the beam directed towards the slide, whereas the lens 21 is traversed by only a central part 16 of this beam. The lens 21 therefore defines a central part, of greater optical power, of the divergent element formed by the two-lens assembly. A device consisting of several small divergent lenses placed side by side can be used instead of a single lens 21.

Moreover, it is possible to subdivide the peripheral part of the divergent optical element into coaxial annular portions of differing optical power.

The form of the divergent optical element having been chosen, its numerical characteristics can be defined as a function of the parameters of the device as a whole, using current optical calculation methods.

I claim:

1. A device for distributing light emitted by a virtual point source (1) on the surface of an image frame (10), comprising focussing means (2) for projecting said light towards an image point of the source, a divergent optical element (7) suitable for transforming the convergent beam emanating from the focussing means into a divergent beam, and a condenser lens (9) collecting said divergent beam to concentrate it towards the image frame, wherein said divergent optical element comprises a central part (15) traversed by the axis (6) of the beam and an annular peripheral part (14) surrounding the central part, the latter having a higher optical power than that of the peripheral part, so that the light rays (16) which pass through it are more or less distributed over the same area of the image frame as the totality (8) of rays passing through the divergent optical element.

2. Device as claimed in claim 1, in which the divergent optical element comprises at least one lens whose one face is concave and has a radius of curvature which is smaller in a central region (12) than in the peripheral region (13) surrounding the central region, said central region and said peripheral region defining the central and peripheral parts of the divergent element.

3. Device as claimed in claim 1, in which the divergent optical element comprises at least two divergent lenses (20, 21) arranged in succession along the axis (6) of the beam and extending radially over different distances from said axis, the lens (21) with the smaller radial extension defining the central part of the divergent optical element.

4. Device as claimed in claim 1, in which the divergent element has a plane face and a concave face.

5. Device as claimed in claim 4, in which said plane face is the entry face.

6. Device as claimed in claim 1, in which the source (1) is a xenon arc lamp.

7. Device as claimed in claim 6, in which said lamp has a power that is more than or equal to 1600 W.

8. Device as claimed in claim 1, in which the focussing means comprise an ellipsoidal concave mirror (2).

9. Device as claimed in claim 1, further comprising an objective lens (11) arranged after the image frame, suitable for projecting on a screen having sides of several meters an image formed on said image frame (10).

* * * * *